(12) United States Patent
Kurihara et al.

(10) Patent No.: US 7,242,551 B2
(45) Date of Patent: Jul. 10, 2007

(54) METHOD FOR INSPECTING TRACK PITCH IN A MAGNETIC DISK

(75) Inventors: Shuhsuke Kurihara, Kanagawa (JP); Kenji Ogasawara, Kanagawa (JP); Yuhji Takagi, Kanagawa (JP); Hiroshi Uchiike, Kanagawa (JP)

(73) Assignee: HItachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/193,942

(22) Filed: Jul. 28, 2005

(65) Prior Publication Data

US 2006/0023344 A1 Feb. 2, 2006

(30) Foreign Application Priority Data

Jul. 30, 2004 (JP) ............................. 2004-223849

(51) Int. Cl.
*G11B 21/02* (2006.01)
*G11B 5/596* (2006.01)
(52) U.S. Cl. ..................... 360/77.08; 360/75
(58) Field of Classification Search .................... None
See application file for complete search history.

(56) References Cited

U.S. PATENT DOCUMENTS

| 6,181,504 | B1* | 1/2001 | Ahn ......................... 360/77.04 |
| 6,369,974 | B1* | 4/2002 | Asgari et al. ............. 360/78.14 |
| 6,751,042 | B2* | 6/2004 | Bi et al. ................... 360/77.02 |
| 7,023,637 | B1* | 4/2006 | Kupferman .................. 360/48 |
| 2005/0168858 | A1* | 8/2005 | Lee et al. ...................... 360/31 |

FOREIGN PATENT DOCUMENTS

JP 07-153212 6/1995

* cited by examiner

*Primary Examiner*—K. Wong
(74) *Attorney, Agent, or Firm*—Townsend and Townsend and Crew LLP; Patrick Duncan

(57) ABSTRACT

Embodiments of the invention provide techniques to inspect the track pitch of a magnetic disk. In one embodiment, the track pitch is inspected using the servo information that was written onto the magnetic disk. A PES gain is set to be PG0. A head is moved to a position K near the position where control is to switch between MPES and SPES, and then MPES and SPES are calculated using reproduced burst signals and PG0. The quantity of change in the inspection HSP which is a half-servo pitch of an inspection-related burst pattern, with respect to an ideal half-servo pitch, is detected by calculating PES$\Delta$, the difference between the MPES and SPES at position K. The track pitch is thus judged whether it is abnormal.

20 Claims, 11 Drawing Sheets

(A)

(B)

Radial direction of disk

Radial direction of disk

METHOD FOR INSPECTING TRACK PITCH IN A MAGNETIC DISK

CROSS-REFERENCES TO RELATED APPLICATIONS

This application claims priority from Japanese Patent Application No. JP2004-223849, filed Jul. 30, 2004, the entire disclosure of which is incorporated herein by reference.

BACKGROUND OF THE INVENTION

The present invention relates to a technology for inspecting the track pitch of the magnetic disk in a magnetic disk drive.

Magnetic disk drives are information recording/reproducing devices that record/reproduce data by reading with a head the servo information written on a magnetic disk, and recognizing the position of the servo information. Typical methods of arranging servo information on a magnetic disk are the servo-surface servowriting scheme and the data-surface servowriting scheme (or the sector servowriting scheme). The servo-surface servowriting scheme is a scheme in which one side of one of plural disks is used exclusively for servo information. The data-surface servowriting scheme is a scheme for recording servo information intermittently in a circumferential direction between data regions on the recording surfaces of plural magnetic disks.

The methods of writing servo information on a magnetic disk can be broadly divided into two types: one type in which, after the magnetic disk has been built into a magnetic disk drive, servo information is written using the head of the magnetic disk drive, and the other type in which servo information is written on the magnetic disk with the disk separated from the magnetic disk drive. The former type includes a writing scheme, also referred to as the push-pin scheme, in which the magnetic disk drive is built into a servo track writer (STW) and then servo information is written using the head moved by the positioning pin of the STW. The former type also includes the so-called self-servowriting scheme. In this scheme, first servo information is written in a reference position previously set inside the magnetic disk drive, then next servo information is written with the position of the previous servo information used as a reference, and this procedure is repeated for each set of servo information to be written.

The latter type includes the so-called pre-servowriting scheme in which the magnetic disk is independently built into an STW and then servo information is written using the head of the STW. The latter type also includes the so-called stamping scheme in which the servo information pre-written on a master magnetic disk is written on other magnetic disks by means of magnetic transfer or the like. Since servo information is for positioning the head, the writing position of the information is required to be highly accurate.

In recent years, the margins between data tracks in magnetic disks have been decreasing with increases in the inter-track density (tracks per inch: TPI) of each disk. The margin between data tracks is a spacing between adjacent tracks, and refers to a region in which no data is written using a recording head. Increases in TPI lead to an increased risk of "squeezing", the event that when the head records data on a data track, the data pre-recorded on adjacent tracks is magnetically affected to disturb recorded binary digit strings.

The head recognizes track positions with the position of servo information used as its reference. Therefore, if the servo information is written such that the pitch of adjacent servo information is smaller than a reference pitch, this is equivalent to the fact that the track pitch has become shorter than its original value, and thus results in squeezing. In short, a change in the pitch of the servo information is equivalent to a change in the track pitch. Changes in the pitch of servo information are due to the mechanical, thermal, and electrical changes occurring in devices related to the writing of the servo information. The changes in the pitch, therefore, are likely to occur in the above-described writing schemes such as the push-pin scheme, self-servowriting scheme, and pre-servowriting scheme. The changes in the pitch of the servo information also become a problem in the servo-surface servowriting scheme and the data-surface servowriting scheme.

The event in which the pitch of servo information changes is observed as an AC-like change in which the pitch regularly changes in plus and minus directions with respect to a reference pitch, or as a DC-like change in which the pitch changes from the reference pitch only by a required value in a certain range. In both cases, it is necessary to detect pitch changes during a product-shipping pre-inspection process and take the proper measures. Patent Document 1 (Japanese Patent Laid-open No. 7-153212) discloses a technology relating to a track width inspection device intended to detect a track width.

BRIEF SUMMARY OF THE INVENTION

The track pitch needs to be inspected in part of a manufacturing process, and the inspection needs to be conducted as both easily and rapidly as possible to minimize reduction in production volumes. In particular, in the self-servowriting scheme where, after a magnetic disk has been built into a magnetic disk drive, servo information is written using the head of the magnetic disk drive, the servo information needs to be written during the final phase of assembly of the magnetic disk. Therefore, track pitch inspection using an STW is restricted by the manufacturing process. If the magnetic disk drive itself can inspect the track pitch by using the servo information written on the internal magnetic disk of the disk drive, this method is convenient for simplifying the inspection process, since there is no need to use a special inspection device. However, even when a burst pattern is written beforehand such that the pitch of the servo information changes from a reference pitch, if the change is slow enough to enable the head to follow it, information on the track pitch cannot be obtained using normal operation sequence.

Hence, a feature of the present invention is to provide a method of inspecting changes in the pitches of the tracks on a magnetic disk within a magnetic disk drive by using the servo information written on the magnetic disk.

Another feature of the invention is to provide a track pitch inspection method that detects changes in the pitch of a track and prevents the possible effects on adjacent tracks.

According to a first aspect of the present invention, there is provided a method for inspecting a track pitch of a magnetic disk in a magnetic disk drive having both a read head and the magnetic disk which includes a data region and on which a first burst pattern and a second burst pattern are recorded. The method includes: setting reference PES gain PG0 with respect to the read head; moving the read head to a position K present between a center of the first burst pattern and a center of the second burst pattern; generating, at the position K, by use of the PG0, a first position detection signal from a first burst signal obtained by reproducing the first burst pattern, and a second position detection signal from a second burst signal obtained by reproducing the second burst pattern; calculating PESΔ that is a difference between the first position detection signal and the second position detection signal; evaluating the PESΔ; and identifying, in response to the evaluation of the PESΔ, a data region related to the first burst pattern or to the second burst pattern.

An ideal value set for each of heads of the magnetic disk drive is used as the gain PG0. Otherwise, the gain PG0 may be a typical value obtained by, for example, generating plural PES gains for the plural burst patterns recorded on the magnetic disk to be inspected, and then averaging the gains. The position K can be set between positions K1 and K2 associated with a region having the portions where, when the read head is moved in a radial direction of the magnetic disk, the first position detection signal and the second position detection signal linearly incline and change are parallel to each other. The position K can be obtained by setting a value of the first position detection signal or of the second position detection signal so as to be an intermediate value between the value of the first position detection signal that is associated with a central position of the first burst pattern, and the value of the second position detection signal that is associated with a central position of the second burst pattern. The position K can be obtained as a position at which a magnitude of the first burst signal and that of the second burst signal become equal to each other. If the PESΔ is greater than a required value, the track pitch is judged to be abnormal, and as a result, a track or sector concerned with the particular burst pattern is registered in a primary defect map to indicate that use of the track or sector has been prohibited.

According to a second aspect of the present invention, there is provided a method for inspecting a track pitch of a magnetic disk in a magnetic disk drive having both a read head and the magnetic disk which includes a data region and on which a first burst pattern and a second burst pattern are recorded. The method includes: setting PG0 as a reference PES gain with respect to the read head; moving the read head to a position K existing between a center of the first burst pattern and that of the second burst pattern; at the position K, by use of the gain PG0, generating a first position detection signal from a first burst signal obtained by reproducing the first burst pattern, and a second position detection signal from a second burst signal obtained by reproducing the second burst pattern; calculating PGn as a PES gain which satisfies a condition necessary to form the first position detection signal and the second position detection signal into a continuum; calculating PGΔ that is a difference between the gains PG0 and PGn; evaluating the PGΔ; and identifying, in response to the evaluation of the PGΔ, a data region related to the first burst pattern or to the second burst pattern.

The present invention has made it possible to provide a method of inspecting changes in the pitches of the tracks on a magnetic disk within a magnetic disk drive by using the servo information written on the magnetic disk. The present invention has also made it possible to provide a track pitch inspection method that detects changes in the pitch of a track and prevents the possible effects on adjacent tracks.

DETAILED DESCRIPTION OF THE INVENTION

Figure 1:
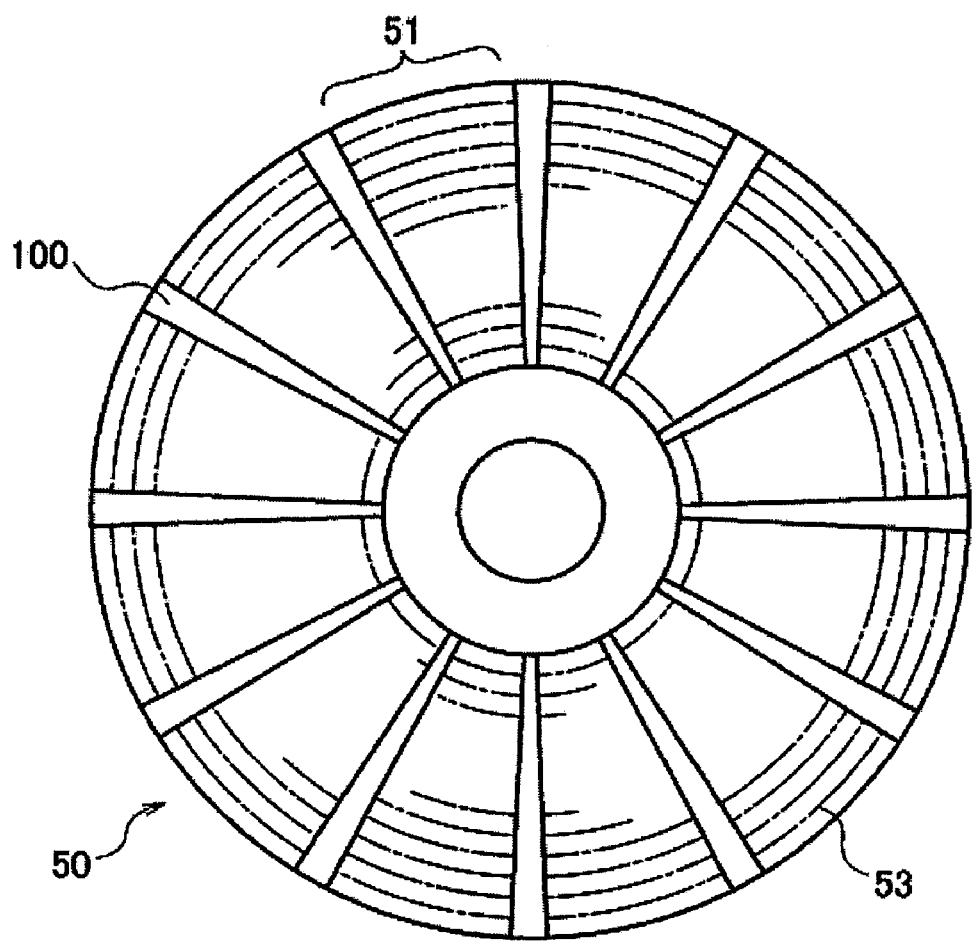
FIGS. 1(A) and 1(B) are diagrams showing a structure of a magnetic disk.
Figure 1:
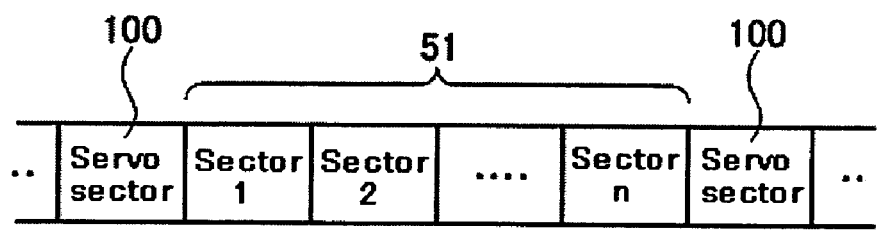

FIGS. 1(A) and 1(B) are diagrams showing structural examples of servo sectors 100 and data regions 51 in a magnetic disk 50. The magnetic disk 50 is used for a magnetic disk drive that adopts a data-surface servowriting scheme. In the data-surface servowriting scheme, when one or more magnetic disks are provided in one magnetic disk drive and a plurality of recording surfaces of the magnetic disk(s) are present, each recording surface has a similar structure. As shown in FIG. 1(A), a plurality of servo sectors 100 are provided radially across an entire recording surface of the magnetic disk 50, and servo information is recorded on each servo sector. The servo sectors 100 and the data regions 51 are arranged alternately in a circumferential direction of the magnetic disk.

Also, a plurality of data tracks (hereinafter, referred to simply as tracks) are defined concentrically in each data region 51 of the magnetic disk 50. The tracks are regions through which a write head or read head located at a required position in a radial direction of the magnetic disk 50 on the basis of the position information obtained from the servo information is to move. As shown in FIG. 1(B), each data region 51 includes the "n" number of sectors predefined as data-recording regions each of 512 bytes, for example.

Figure 2:
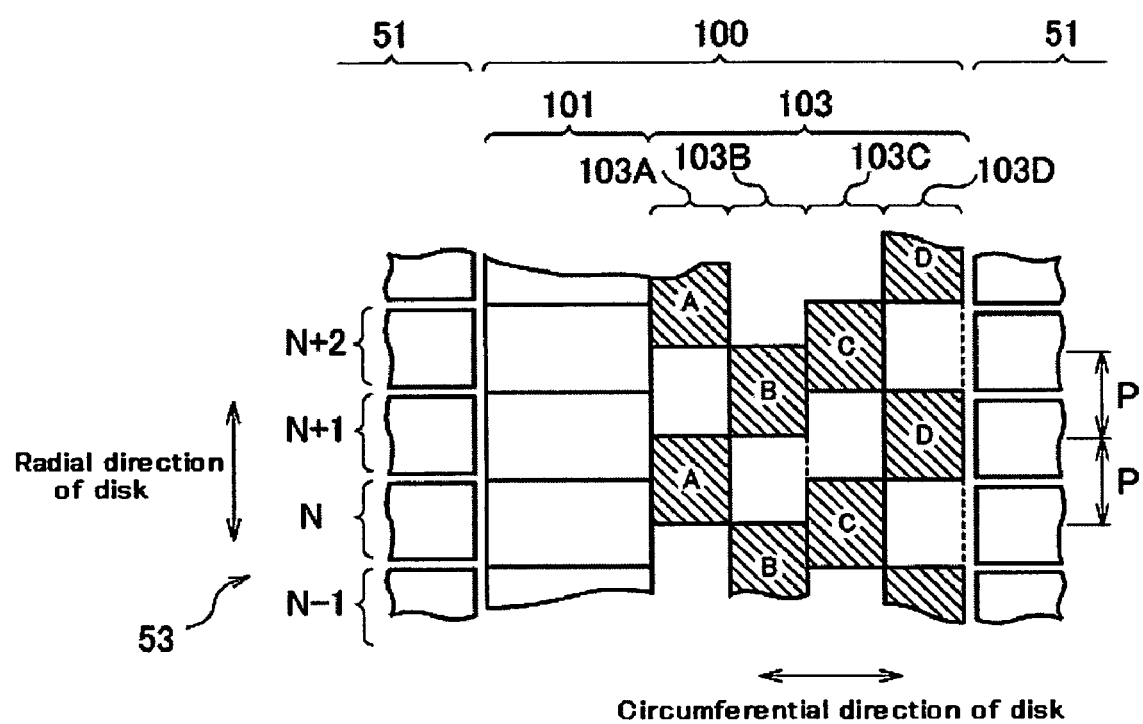
FIG. 2 is a partially enlarged view of the magnetic disk.

FIG. 2 is a partially enlarged view of the magnetic disk 50 shown in FIGS. 1(A) and 1(B). The tracks N−1, N, N+1, and N+2 that are defined in one data region 51, and a servo sector 100 adjacent thereto in the radial direction of the disk are shown in FIG. 2. The servo sector 100 includes an identification information region 101 and a burst pattern region 103. In the burst pattern region 103, main burst pattern rows 103A, 103B, and sub-burst pattern rows 103C, 103D are provided in the radial direction of the magnetic disk 50. The burst pattern rows 103A, 103B, 103C, and 103D include the burst patterns A, B, C, and D, respectively, that are written so as to be of the same size in the radial direction of the disk.

The main burst pattern rows 103A and 103B are recorded in the position where phases of their respective reproduction signals are shifted through 180 degrees with respect to each other when the head moves in the radial direction of the disk, and the main burst pattern rows each form main burst patterns. The sub-burst pattern rows 103C and 103D are recorded in the position where phases of their respective reproduction signals are shifted through 180 degrees with respect to each other when the head moves in the radial direction of the disk, and the sub-burst pattern rows each form sub-burst patterns. Each main burst pattern and each sub-burst pattern are recorded so as to have a relationship in which phases of their respective reproduction signals are shifted through 180 degrees with respect to each other. The size of each burst pattern in the radial direction of the disk, i.e., a pitch (hereinafter, referred to as a servo pitch) of the burst pattern is equal to track pitch P or almost equal to a width of tracks 53.

Here, for the sake of convenience in description, a radial position on the disk where the main burst patterns A and B change with respect to each other is taken as a center of the main burst pattern, and a radial position on the disk where the sub-burst patterns C and D change with respect to each other is taken as a center of the sub-burst pattern. Also, a center of track width is taken as that of the track.

In the magnetic disk of FIG. 2, the center of the main burst pattern and that of each track 53 agree with each other and the center of the sub-burst pattern and a boundary between tracks 53 or a center of an intertrack margin agree with each other. The scope of the present invention, however, is not limited by this structure, and the invention can be applied even to a structure in which the center of the main burst pattern and that of the track do not agree with each other. For example, Japanese Patent Laid-open No. 2004-30778 discloses a magnetic disk drive in which centers of main burst patterns and those of tracks do not agree with each other. A beginning code for a servo sector is recorded at the beginning of the identification information region 101. A gray code (cyclic binary code) denoting a track identification number, a code denoting a physical identification number for the servo sector 100, and other codes are also recorded in the identification information region 101.

Figure 3:
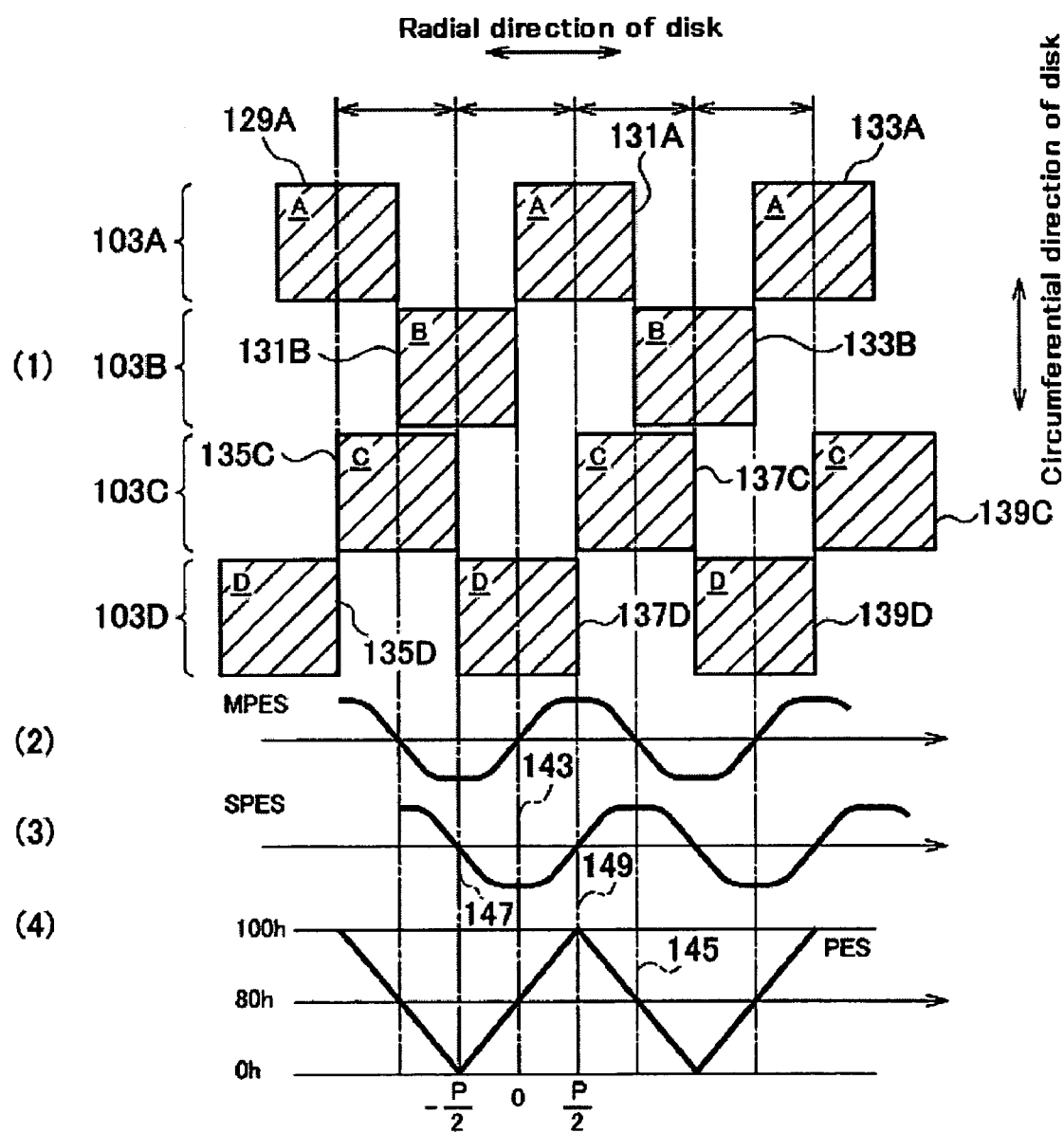
FIG. 3 is a diagram explaining the principles of generating PES from burst patterns.

FIG. 3 is a diagram describing the principles of generating position information signals (in this SPECIFICATION, referred to collectively as PES: Position Error Signal) from the main burst pattern rows 103A, 103B, and sub-burst pattern rows 103C, 103D shown in FIG. 2. The main burst patterns constituting the main burst pattern row 103A are shown as 129A, 131A, and 133A, and the main burst patterns constituting the main burst pattern row 103B are shown as 129B, 131B, and 133B. Likewise, the sub-burst patterns constituting the sub-burst pattern row 103C are shown as 135C, 137C, and 139C, and the sub-burst patterns constituting the sub-burst pattern row 103D are shown as 135D, 137D, and 139D.

In general, sizes of the read gaps formed in the read head for reading burst patterns are reduced below servo pitch P or track pitch P for reasons such as improvement of an error rate. Therefore, when each burst pattern shown in (2) of FIG. 3 is reproduced by being read while the read head is being moved from the track N−1, toward the track N+2, in the radial direction of the magnetic disk, the main position detection signal (hereinafter, referred to as MPES) that changes as shown in (2) of FIG. 3 is obtained from the main burst pattern row 103A, 103B. Similarly, the sub-position detection signal (hereinafter, referred to as SPES) that changes as shown in (3) of FIG. 3 is obtained from the sub-burst pattern row 103C, 103D. Here, MPES and SPES are calculated using the following expressions:

[Numeric expressions 1]

$$MPES = \frac{A-B}{A+B}PG + 80h \tag{1}$$

$$SPES = \frac{C-D}{C+D}PG + (100h) \tag{2}$$

In the above expressions, symbols A, B, C, and D are values indicating the magnitude of burst signals into which the values that were read from each burst pattern by the read head are preamplified by a preamplifier and then converted into digital values. Symbol PG denotes a parameter referred to as a PES gain, which is a value for adjusting inclination angles of linear portions of MPES and SPES. Section "80 h" (hereinafter, "h" denotes a hexadecimal number) and section "100 h" are bias values. In the above expression (2), as described later herein, when MPES and SPES are to be formed into a continuum to generate PES, "100 h" may or may not be added, depending on a particular position of the read head with respect to that of the sub-burst pattern.

In FIG. 3, the radial positions on the magnetic disk 50 are shown as centers of the read gaps formed in the read head, and more particularly, as positions of magnetic centers of the read gaps. Hereinafter, positions of the read head mean the centers of the read gaps. As shown in (2) of FIG. 3, MPES changes so as to linearly increase or decrease when the read head moves past near a center 143 of the main burst pattern formed up of the main burst patterns 131B and 131A, and a center 145 of the main burst pattern formed up of the main burst patterns 131A and 133B. However, when the read head moves past near a center 147 of a sub-burst pattern formed up of the sub-burst patterns 135C and 137D, and a center 149 of a sub-burst pattern formed up of the sub-burst patterns 137D and 137C, MPES includes portions at which its value becomes constant.

Conversely, as shown in (3) of FIG. 3, SPES changes so as to linearly increase or decrease when the read head moves past near the centers 147 and 149 of the sub-burst patterns; however, when the read head moves past near the centers 143 and 145 of the main burst patterns, SPES includes portions at which its value becomes constant.

The above arises from the fact that a longitudinal size of each read gap in the read head is smaller than a length of each burst pattern in the radial direction of the disk. The section where the value of MPES or SPES becomes constant even when the read head moves is referred to as a dead zone. When the read head is positioned in the dead zone, position information on the read head cannot be obtained from MPES or SPES. In the present embodiment, the positions of the read head that exist between servo pitch P represented by the centers 143 and 145 of the main burst patterns are expressed as 256 digital values. The magnetic disk drive recognizes the positions of the read head in the radial direction of the disk, from digital values 0 to 255.

As shown in expressions 1, MPES changes with a bias value of 80 h as its center, whereas, although SPES changes similarly to MPES, SPES changes with a bias value of 100 h or 0 h as its center. The magnetic disk drive recognizes changes in the position of the read head in the radial direction of the disk, as changes in MPES or SPES. Therefore, near the centers 143 and 145 of the main burst patterns where MPES linearly changes, it is possible to use MPES as position information. Near the centers 147 and 149 of the sub-burst patterns, however, MPES cannot be used as position information, since its value does not change even when the position of the read head changes.

Nevertheless, near the centers 147 and 149 of the sub-burst patterns, since SPES changes linearly, consideration is given so as to employ SPES when the read head is positioned at these centers. Appropriate PES for position control of the read head is obtained from MPES and SPES by selecting either MPES or SPES, depending on the position of the head, as a position information signal to be used.

Section (4) of FIG. 3 shows the PES generated by combining the linear portions of MPES and SPES. During the generation of the PES, in the regions where SPES increases, the bias value of 100 h is added to SPES, and in the regions where SPES decreases, the bias value of 100 h is not added. Furthermore, for any SPES portions that consequently exceed 100 h, the excess with respect to 100 h is subtracted therefrom, and for any SPES portions that consequently decrease below 0 h, an absolute value of the shortage with respect to 0 h is added thereto. These arithmetic operations ensure the PES having the characteristic that its value repeats rapidly changing at 0 h and 100 h as in (4) of FIG. 3.

When the read head is present at a position within ¼ of servo pitch P from the center of each main burst pattern in the radial direction of the disk, MPES is used, and when the head is distant by more than ¼ of servo pitch P, SPES with a previously set bias value is used. At the position where the read head is distant from the center of the main burst pattern by ¼ of servo pitch P, since MPES takes a value of C0 h or 40 h, the MPES or SPES for generating PES is selected using the MPES value of C0 h or 40 h. Since a value of SPES for which a bias value has been set becomes the same as the value of MPES at the position where the read head is distant from the center of the main burst pattern by ¼ of servo pitch P, an MPES/SPES selection can likewise be conducted by using the value of SPES.

Figure 4:
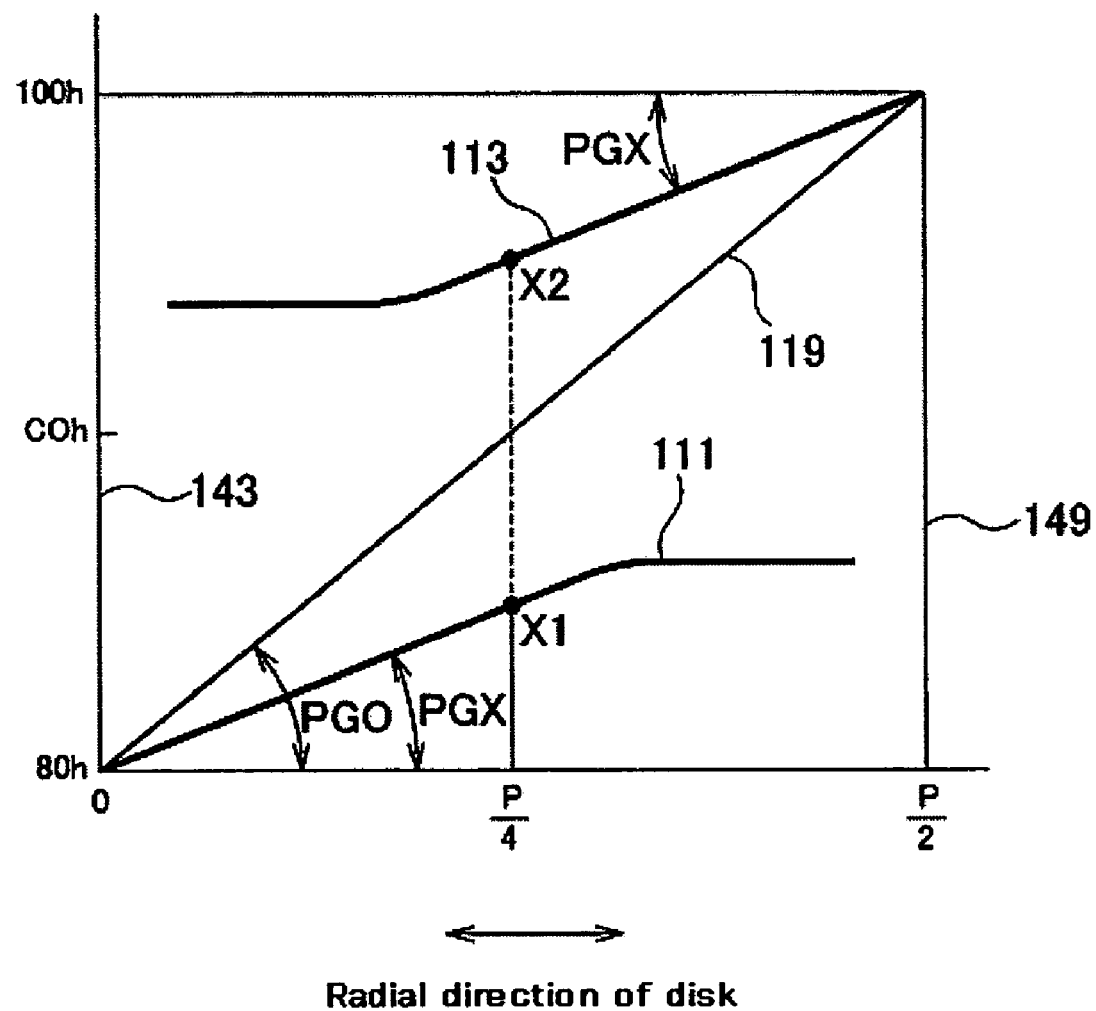
FIG. 4 is a diagram explaining a PES gain.

Next, a PES gain is described with reference to FIG. 4. FIG. 4 shows the MPES and SPES that were calculated from burst signals in the range from the center 143 of the main burst pattern shown in (4) of FIG. 3, to the center 149 of the sub-burst pattern shown therein, by use of PES gain PGX. In FIG. 4, MPES 111 and SPES 113 are separate from each other since they cannot be connected into one linear form analogous to that of PES 119.

In the state where MPES 11 and SPES 113 are not continuous as in FIG. 4, the read head may be moved to a position of P/4 equivalent to an intermediate position between the center 143 of the main burst pattern and the center 149 of the sub-burst pattern. In this case, if the position detection signal that PES is to use is changed between MPES and SPES, the value of PES changes between a value associated with position X1 and a value associated with position X2, in spite of the position of the read head not changing. The position of the head, therefore, cannot be controlled. The parameter used to form the separate MPES and SPES into a continuum is the PES gain.

In an as-assembled state of the magnetic disk drive, the PES gain is not appropriately set. For this reason, MPES 111 and SPES 113 are in such a state as shown in FIG. 4, under arbitrary PES gain PGX. In order to connect the separate MPES 111 and SPES 113 into one PES 119, the PES gain is set to have a value of PG0 during the inspection process of manufacture. PG0 is an ideal value for connecting MPES 111 and SPES 113 so that both continue at linear portions.

A method of obtaining an ideal PES gain is described in Japanese Patent Laid-open No. 9-180388.

Figure 5:
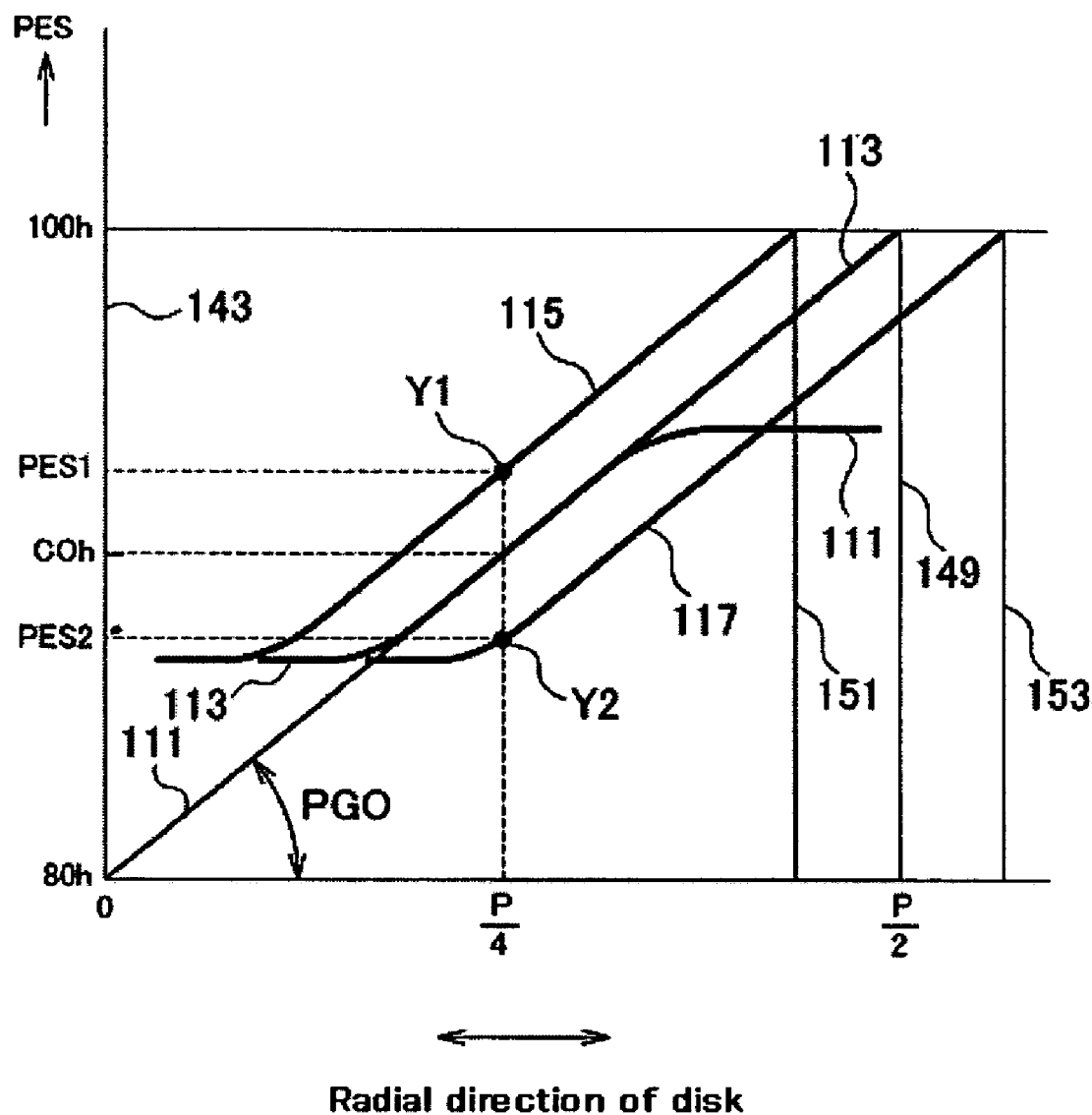
FIG. 5 shows the characteristics of the PES existing when the distance between the center of the main burst pattern and the center of a sub-burst pattern varies.

FIG. 5 is a diagram explaining a state of the PES existing when a distance between the center 143 of the main burst pattern and the center 149 of the sub-burst pattern varies under the situation where the PES gain is set to take its optimum value of reference PES gain PG0 (hereinafter, this distance is referred to as half-servo pitch HSP). In FIG. 5, the distance between the center 143 of the main burst pattern and the center 149 of the sub-burst pattern is an ideal HSP planned for recording servo information, and is let be reference HSP hereinafter. In FIG. 5, the PES gain is set to be PG0 such that the MPES 111 and SPES 113 that were calculated using the burst signals reproduced from the main burst pattern and sub-burst pattern written with the reference HSP continue as one straight line.

Here, consider the PES existing when burst patterns are written for their HSP to change from the reference HSP under the state where the PES gain is maintained at PG0. For example, assume that the HSP has become smaller than the reference HSP as a result of writing sub-burst patterns 137D and 137C so as to change the center 149 of the sub-burst pattern of FIG. 3 to a center 151 in FIG. 5 with respect to the center 143 of the main burst pattern shown in FIG. 3. The SPES 115 that was calculated, by use of PG0, from the burst signals obtained by reading the sub-burst patterns 137D and 137C with their center taken as 151, appears the same as SPES 113 when it is moved horizontally in a leftward direction of FIG. 5. Consequently, as in FIG. 5, the MPES 111 and the SPES 115 lose their continuity. When the read head is present at P/4 that is an intermediate position of the reference HSP, a difference between PES1 equivalent to Y1, and C0 h, occurs between the value of the MPES 111 and that of the SPES 115.

Also, assume that the HSP has become longer than the reference HSP as a result of writing the sub-burst patterns 137D and 137C so as to change the center 149 of the sub-burst pattern of FIG. 3 to a center 153 in FIG. 5 with respect to the center 143 of the main burst pattern shown in FIG. 3. The SPES 117 that was calculated, by use of PG0, from the burst signals obtained by reading the sub-burst patterns 137D and 137C with their center taken as 153, appears the same as SPES 113 when it is moved horizontally in a rightward direction of FIG. 5. Consequently, the MPES 111 and the SPES 117 lose their continuity. When the read head is present at P/4 that is an intermediate position of the reference HSP, a difference between C0 h and PES2 equivalent to Y2 occurs between the value of the MPES 111 and that of the SPES 117.

It can be seen from the above that a change in the HSP concerning a servo pattern, with respect to the reference HSP, is detectible as the difference from MPES and PES that occurs when the read head is moved to a required position. Since the recording head is positioned at a center of a required track on the basis of the burst signals that the read head generated, a change in servo pitch or a change in track pitch can be detected by detecting the change in the HSP.

Based on the above knowledge, a description of a track pitch inspection sequence according to the present embodiment is given below with reference to the flowchart shown in FIG. 6. In block 201, the reference gain PG0 is set that is associated with a combination of the magnetic disk to be inspected, and the read head. The PG0 is a value that makes MPES and SPES continue as one straight line. Since the PG0 changes with the position of the read head and the value of HSP, although the PG0 is originally to be calculated independently for each of the read heads used and for each burst pattern, this calculation method is not realistic because of too many PG0s being generated. The HSP between actually written burst patterns does not completely agree with the reference HSP. For a large majority of burst patterns, however, the HSP stays within an allowable range with respect to the reference HSP, and thus the number of burst patterns written with a non-allowable HSP is as small as they occur only locally. Based on assumption of this, a description of a realistic method for PG0 setting is given below with reference to FIG. 8.

Figure 8:
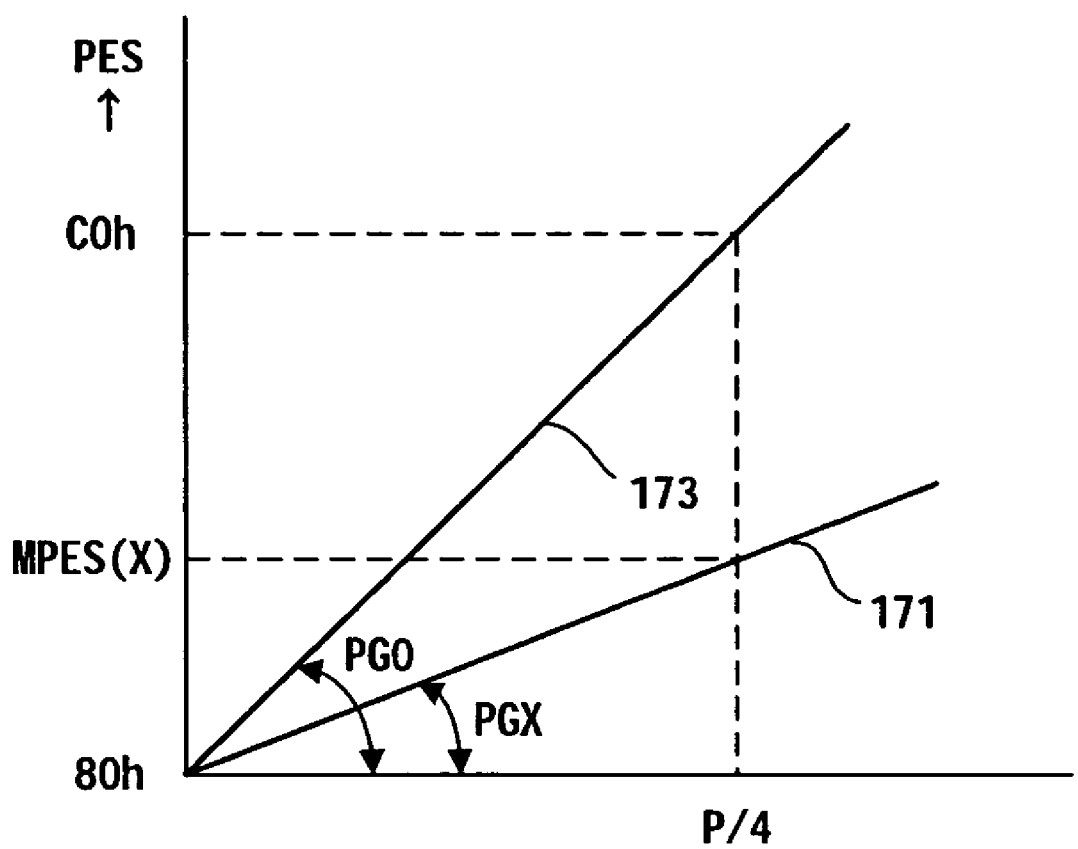
FIG. 8 is a diagram explaining a method of setting reference PES gain PG0.

Assume that in FIG. 8, the magnetic disk drive is only in a completed state of assembly, and the PES gain is set to have an arbitrary value of PGX. When the read head is moved in the radial direction of the disk under PGX, the main burst patterns 131B and 131A are read and MPES 171 is thus obtained. The read head is moved to an intermediate position of P/4 of the HSP in order to adjust the PGX that was used for generating the MPES 171, and calculate the reference PES gain PG0 for generating ideal MPES 173. The intermediate position P/4 of the HSP is equivalent to the intermediate position between the respective centers 143 and 149 of the main burst pattern and sub-burst pattern shown in FIG. 4.

A position in FIG. 3 where the magnitude of burst signals equals between the main burst pattern 131A and the sub-burst pattern 137D is selected to actuate the head to the position P/4. A position at which the magnitude of burst signals equals between the main burst pattern 133B and the sub-burst pattern 137C may be selected instead. In general, the position where the value of the main burst pattern and that of the sub-burst pattern becomes equal is selected. Next, MPES is measured with the read head positioned at P/4. Take the value thus obtained, as MPES(X). For the ideal MPES 173 at which MPES and SPES continue, C0 h is the value of PES that is obtained when the read head is positioned at P/4. Reference PES gain PG0 can therefore be calculated using expression (3).

[Numeric expression 2]

$$PG0 = \frac{C0h - 80h}{MPES(X) - 80h} \times PGX \quad (3)$$

It is possible to define PG0 independently for each read head used and for each HSP of burst patterns, and in the present embodiment, reference PES gain PG0 to be set as an ideal value usable over an entire surface of the magnetic disk, is calculated as below. First, the plural burst patterns that were written onto the magnetic disk are selected, a burst signal is reproduced from each of the burst patterns, and plural MPES(X)'s are calculated. Next, PG0($n$) values are calculated using the above expression (3) for the plural MPES(X)'s, an average value is calculated as a typical value of PG0($n$), and this value is set as reference PES gain PG0. A method other than averaging, such as extracting a median value, may be adopted when the typical value of PG0($n$) is determined.

For example, if 168 servo sectors are provided for one track, the number of burst patterns selected can be set to about 2,688 in all by selecting 16 servo tracks for one recording surface of the magnetic disk. In order to minimize any effects of local changes in HSP, positions of the burst patterns are selected so that the positions recorded over the entire surfaces of the magnetic disk in radial and circumferential directions thereof do not concentrate in specific sections. Reference PES gain PG0 is set for each read head or for each recording surface, and then stored into a memory of the magnetic disk drive.

Figure 9:
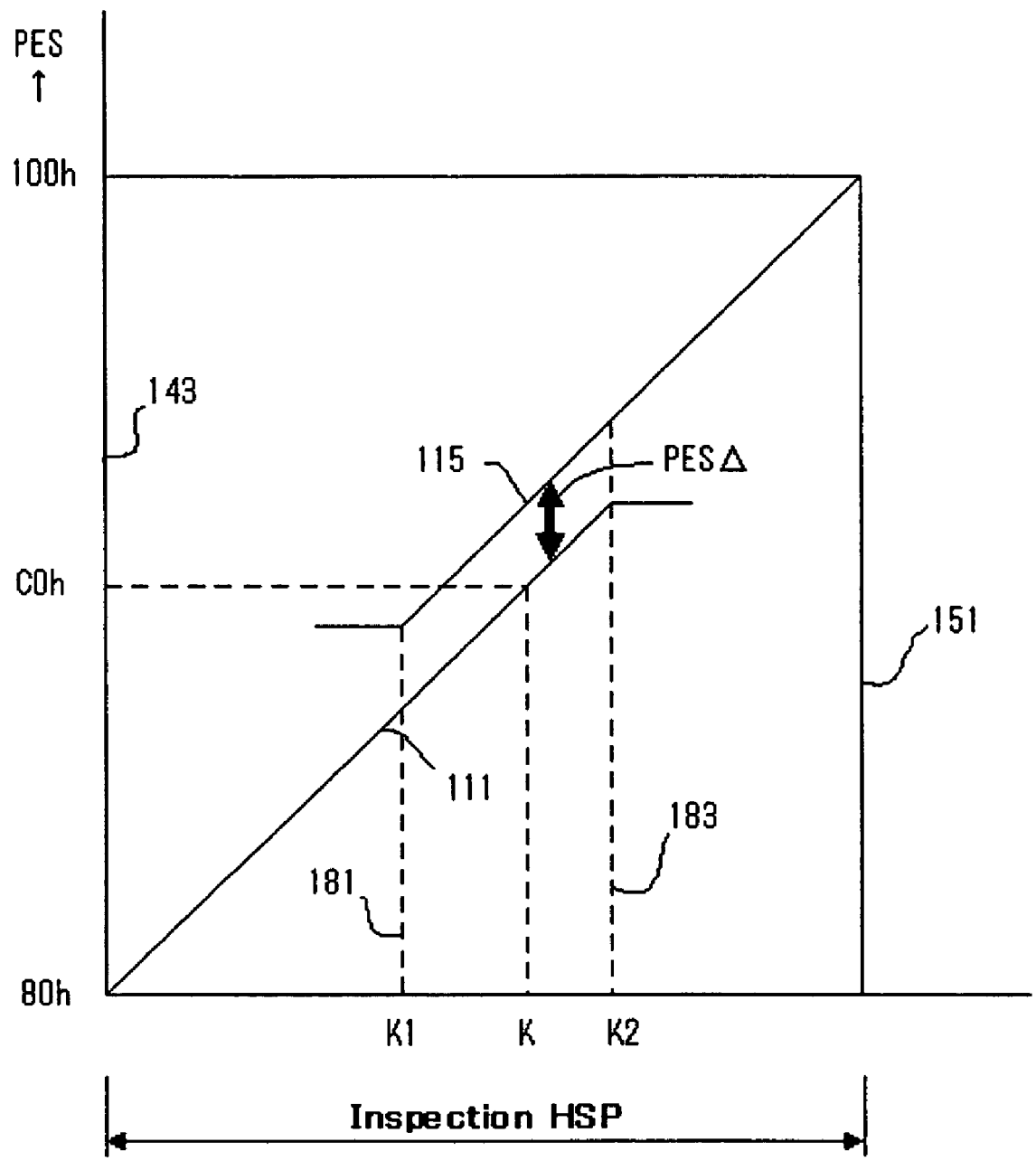
FIG. 9 is a diagram explaining position K.

In block 203 of FIG. 6, the read head is moved to a position K close to an intermediate position of HSP related to a burst pattern to be inspected (hereinafter, this HSP is referred to as inspection HSP). Position K is described below referring to FIG. 9. In FIG. 9, MPES 111 and SPES 115 are extracted from FIG. 5, and constant portions of PES and inclining portions thereof are each connected in a simplified form by a straight line. Both the MPES 111 and the SPES 115 have linearly inclining portions. In a range between the positions K1 and K2 established respectively by straight lines 181 and 183 parallel to the center 143 of the main burst pattern or the center 151 of the sub-burst pattern, the MPES 111 and the SPES 115 incline and the linearly changing portions thereof are parallel to each other.

After the read head has been positioned to stay in the region where the linearly inclining portions of the MPES 111 and the SPES 115 are parallel to each other, when burst signals are reproduced, PESΔ that is a difference between the MPES 111 and the SPES 115 takes the same value even if measured at any location. The PESΔ, therefore, serves as a stable alternative characteristic during detection of changes in inspection HSP with respect to reference HSP. This means that as long as the read head is positioned to stay in the region where the linearly inclining portions of the MPES 111 and of the SPES 115 are parallel to each other, the PESΔ can serve as a stable alternative characteristic having a quantitative correlation with a change in inspection HSP with respect to reference HSP. Position K is therefore selected between positions K1 and K2. Accuracy deteriorates if position K oversteps the range between positions K1 and K2 too significantly. Provided, however, that the range is overstepped only slightly, a tendency for HSP to change can be confirmed. Position K can likewise be obtained for a relationship between the MPES 111 and SPES 117 of FIG. 5.

One method available to set position K would be by moving the read head to a position at which the MPES 111 takes a value of C0 h in FIG. 9. The position of the read head where the MPES 111 takes the value of C0 h is the intermediate position of the reference HSP existing when burst patterns are written therewith. In terms of the probability that too great an inspection HSP error will not occur, the above position can be said to exist between positions K1 and K2 in FIG. 9. As is obvious from FIG. 9, selecting the value of the MPES 111 as C0 h and then moving the read head to that position is an example. In addition, even if a value close to C0 h is adopted instead, the PESΔ can be measured by moving the read head to a position between positions K1 and K2. As another example, the read head may be moved to where the SPES 115, instead of the MPES 111, is to be taken as a required value.

Another possible method of setting position K would be by moving the read head to a position at which the main burst pattern 131A and sub-burst pattern 137D shown in FIG. 3 become equal to each other. While the burst pattern that the read head is to read changes from the main burst pattern 131A to the sub-burst pattern 137D, the position of the read head does not change too significantly. Therefore, the intermediate position between positions K1 and K2 or of the inspection HSP can likewise be set as position K by using this method. As is obvious from FIG. 3, at other positions in the radial direction of the disk, the read head may be moved to a position at which the main burst pattern 133B and the sub-burst pattern 137C become equal to each other. In general, a position at which the burst signals that were reproduced from a main burst pattern and a sub-burst pattern become equal to each other is selected.

Figure 6:
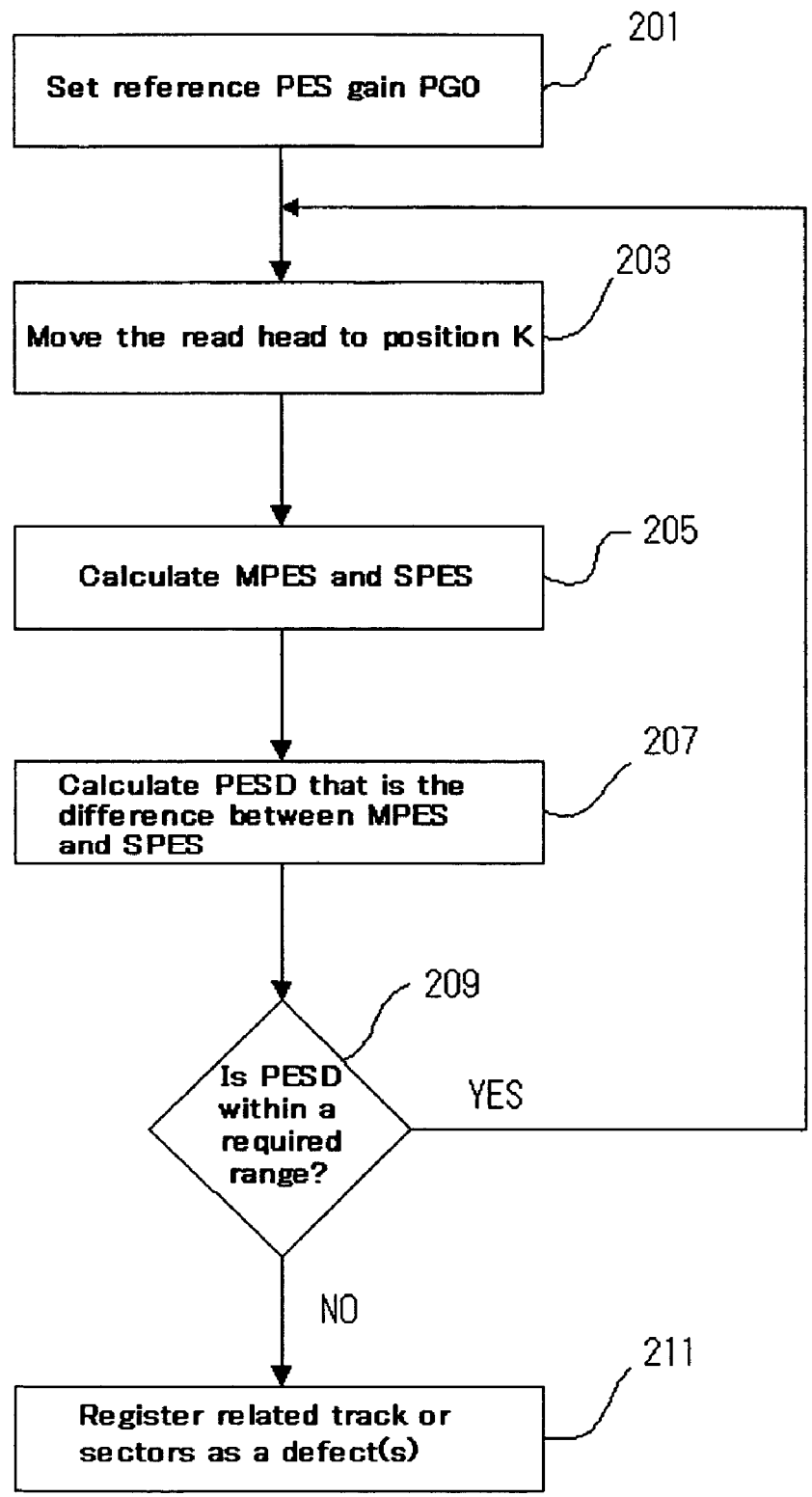
FIG. 6 is a flowchart explaining a sequence used to detect changes in track pitch and then register defects.

Next, in block 205 of FIG. 6, PG0 is applied to expressions (1) and (2) and MPES and SPES are calculated from the burst signals that were read with the read head positioned at K. For the SPES 113 shown in FIG. 5 by way of example, a bias value of 100 h is added to SPES 115 by use of expression (2). In block 207, the PESΔ that is the difference between calculated MPES 111 and SPES 115 is calculated. After this, in block 209, it is judged whether the calculated value of the PESΔ is outside a required data range. If the difference between the SPES and the MPES is positive, this indicates that the inspection HSP is smaller than the reference HSP. In addition, if the difference is negative, this indicates that the inspection HSP is greater than the reference HSP. In the present embodiment, irrespective of whether the inspection HSP is smaller or greater than the reference HSP, the track pitch is judged to be abnormal, provided that an absolute value of the PESΔ is greater than the required value.

If the PESΔ is outside the required data range, the track pitch is abnormal and control is therefore transferred to block 211. At this block, address information on a track, or sectors, related to the particular burst pattern is then registered in a primary defect map so as to prohibit use of the track or sectors. The track related to the particular burst pattern means a track at which a burst pattern related to generating the PESΔ which indicates the abnormality of the track pitch is being used for position control. In the example of FIG. 3, the above track refers to the track using either the main burst pattern 131B, 131A, the sub-burst pattern 137D, or 137C, for position control.

Also, the sectors related to the particular burst pattern mean, among all sectors included in the track for positioning by use of the burst signal of the burst pattern, only those sectors within the data region that are disposed at positions proximate to the burst pattern in the circumferential direction of the disk. The primary defect map is a table used to detect defective sectors by inspecting the surface of the magnetic disk prior to shipping of the magnetic disk drive, and then to register the corresponding logic block address in order to prohibit the use of those sectors. Such mapping is a technology well known among persons skilled in the art. If it is found in block 209 that the PESΔ is within the required range, control is returned to block 203. In this block other burst patterns are then further inspected and the entire recording surface is inspected and registered in a sequence similar to the above. If the magnetic disk drive has more than one head, after inspection of one recording surface, heads are changed and another recording surface is inspected and registered. At this time, the value that was set for the new head is used as PG0.

Figure 7:
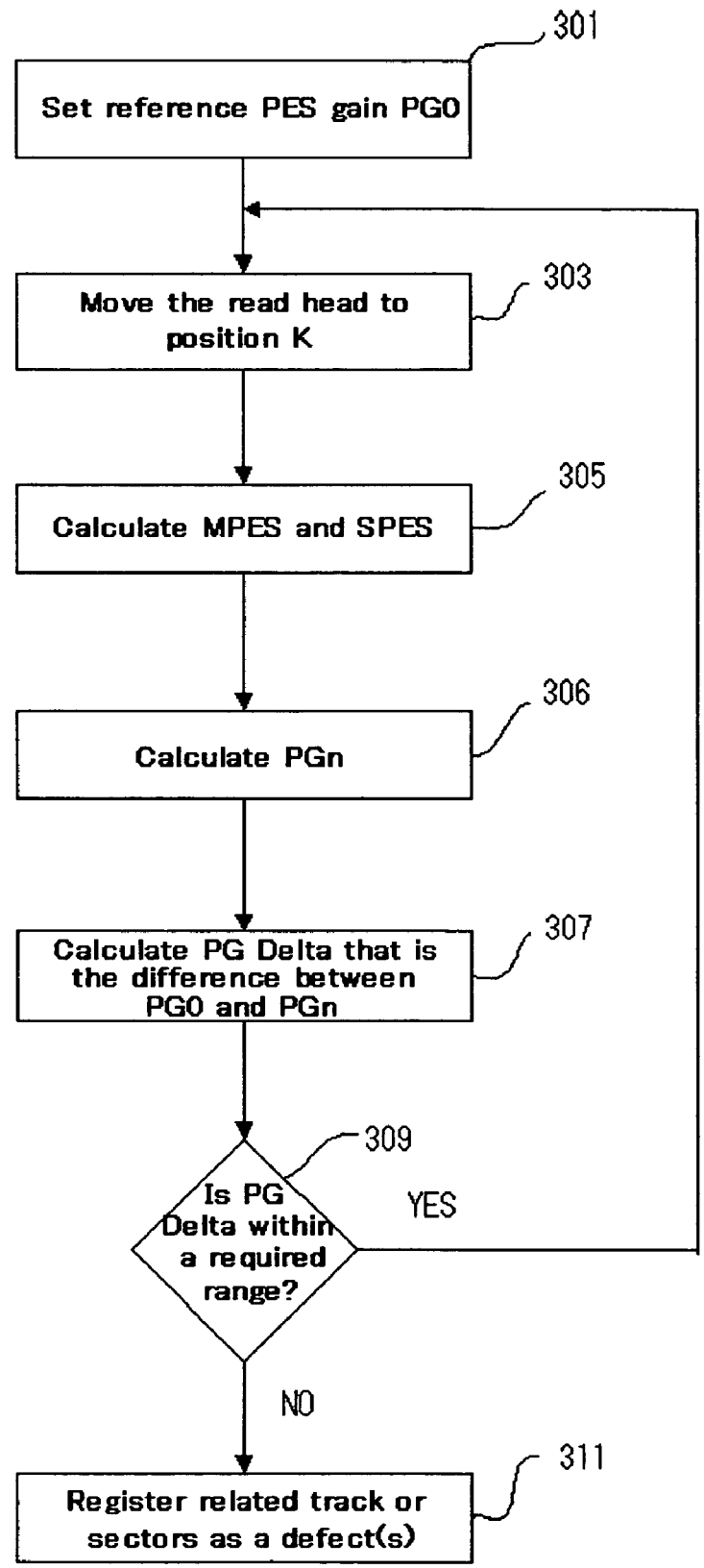
FIG. 7 is a flowchart explaining another sequence used to detect changes in track pitch and then register defects.
Figure 10:
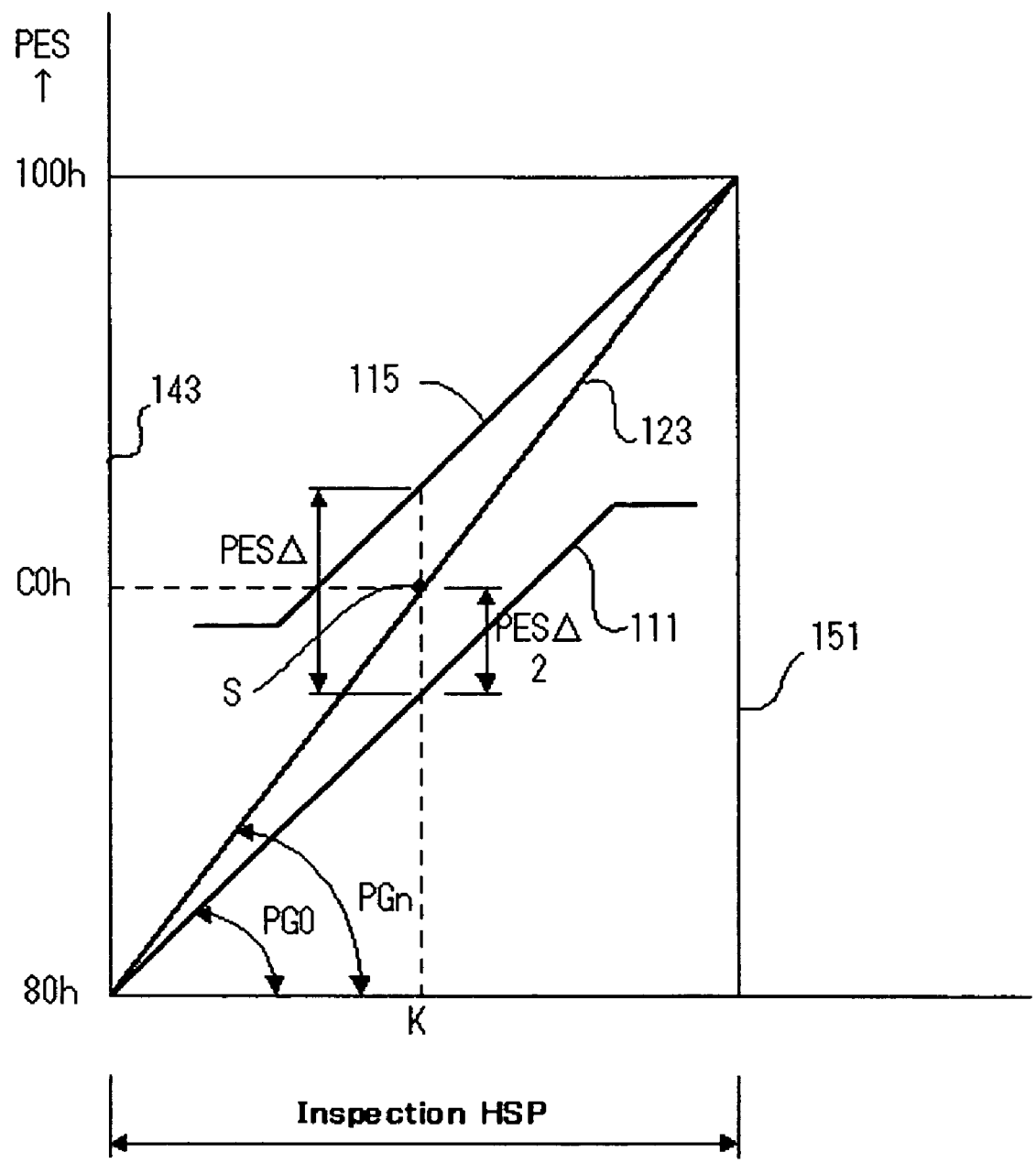
FIG. 10 is a diagram explaining a method of calculating PGn.

Next, another sequence for detecting changes in track pitch and then registering defects is described below with reference to FIGS. 7 and 10. A description of the blocks 301, 303, 305, and 311 shown in the flowchart of FIG. 7 is omitted since these blocks are respectively the same as the blocks 201, 203, 205, and 211 shown in the flowchart of FIG. 6. The MPES 111 and SPES 115 in FIG. 5 are the same as those of FIG. 9. Since a center of sub-burst patterns 137D and 137C is taken as 151 and inspection HSP is smaller than reference HSP, the MPES 111 and the SPES 115 are not continuous on line 123. In block 306, PES gain PGn for making the MPES 111 and the SPES 115 continuous as one straight line is calculated.

When the MPES 111 and the SPES 115 are continuous on line 123, the MPES 111 and SPES 115 at intermediate position K of the inspection HSP become C0 h. Therefore, PGn for defining, as C0 h, the value of PES at intermediate value S of the MPES 111 and the SPES 115 when the read head is positioned at K, can be calculated using expression (4).

[Numeric expression 3]

$$PGn = \frac{C0h - 80h}{C0h - 80h \pm \frac{PES\Delta}{2}} \times PG0 \qquad (4)$$

In expression (4), the minus sign of PESΔ/2 applies to the case where PGn is calculated for the SPES 115 at which the inspection HSP is smaller than the reference HSP. In the present embodiment, since position K is a position set to detect changes in the inspection HSP by using PGn as an alternative characteristic, the read head does not need to be moved to the intermediate position of the inspection HSP and thus the method described in block 203 of FIG. 6 can be adopted. In block 307, PG Delta (PGΔ), a difference between PGn and PG0, is calculated. In block 309, it is judged whether PG Delta (PGΔ) is within a required data range. If PGn is greater than PG0, this indicates that the inspection HSP is smaller than the reference HSP. In addition, if PGn is smaller than PG0, this indicates that the inspection HSP is greater than the reference HSP. In the present embodiment, the value of PG Delta (PGΔ) is evaluated in terms of absolute value similarly to block 209. The calculation of PGn can use a program that calculates reference PES gain PG0. Changes in track pitch can therefore be easily detected only by moving the read head to the position K.

Figure 11:
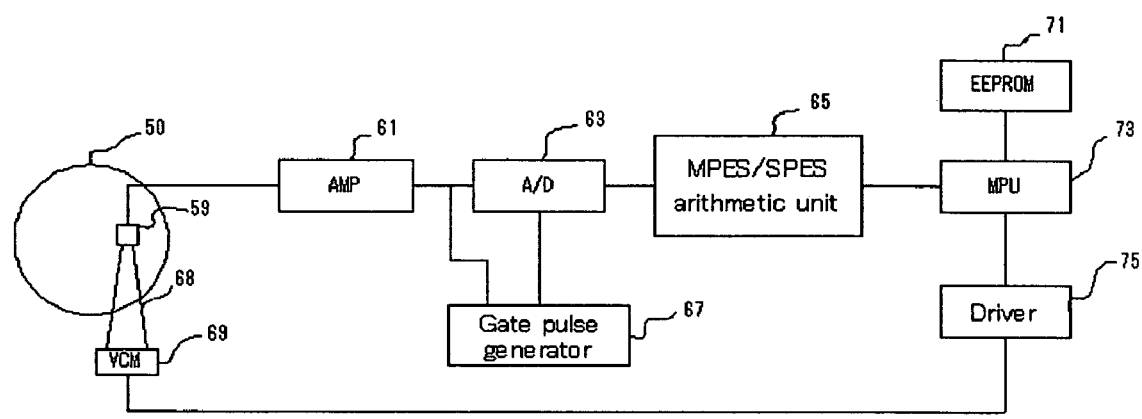
FIG. 11 is a block diagram showing the elements of a magnetic disk drive that are related to embodying the present invention.

FIG. 11 is a block diagram showing the elements of the magnetic disk drive that are related to embodying the present invention. A magnetic disk assembly 50 employs a laminated structure having one or more magnetic disks, and each magnetic disk has its surface and bottom serving as recording regions, in each of which servo information is written. A slider section 59 has write heads and read heads. The slider section 59 has sliders as many as there actually are recording surfaces that the magnetic disk assembly 50 has. Each slider has a write head and a read head, both being of the same structure. The slider section 59 is installed at an actuator arm assembly 68.

The actuator arm assembly 68 is driven by a voice coil motor (VCM) 69 and pivotally moves around a pivot axis. A preamplifier 61 is connected to the head. The preamplifier 61 preamplifies a signal that the read head has read from the magnetic disk assembly 50, or preamplifies a signal that the write head writes onto the magnetic disk assembly 50. An analog/digital (A/D) converter 63 converts into digital data the analog data that the read head has read. A gate pulse transducer 67 detects burst signals A, B, C, D, and selects a burst signal that the analog/digital converter 63 is to send to an MPES/SPES arithmetic unit 65. The MPES/SPES arithmetic unit 65 calculates MPES and SPES in accordance with expressions (1) and (2) by use of the burst signals A, B, C, D, and PES gain PG.

An EEPROM 71 stores not only the reference PES gain PG0s that were calculated for each head, but also a primary defect map and more. An MPU 73 calculates a position of the head from the MPES and SPES that were received from the MPES/SPES arithmetic unit 65, and sends to a driver 75 a signal for controlling the VCM 69. The MPU 73 also controls operation of the magnetic disk drive in accordance with the sequences described in FIGS. 6 and 7. In addition, the MPU 73 calculates PESΔ and PGΔ, detects abnormality of a track pitch, and registers track or sector information in the primary defect map. The driver 75 generates a control current for the VCM 69, from the digital signal that has been sent from the MPU 73. The configuration shown in FIG. 11 is an example, and any configuration obvious to persons skilled in the art can be adopted when the present invention is embodied.

The PG0 used in the track pitch inspection method according to the present invention is always set during an inspection process at a manufacturing phase of a magnetic disk drive. According to the track pitch inspection method of the present embodiment, therefore, a program for implementing the sequences described in FIGS. 6 and 7 can be easily executed after installation in the magnetic disk drive, followed by the inspection process during which the PG0 is adjusted. The present invention, although applicable to the servo-surface servowriting scheme and the data-surface servowriting scheme, is particularly convenient for magnetic disk drives of the self-servowriting scheme which enables servo information to be written without using an STW, since this scheme does not require use of a special device during track pitch inspection. Additionally, according to the present invention, process simplification is possible since track pitch inspection can be incorporated into the inspection process for magnetic disk drives. Furthermore, since the addresses of detected defective tracks are registered in a primary defect map to prohibit the use of the defective tracks, the possible risk of a user using tracks of narrow pitches is eliminated and this enables a quality assurance capability to be improved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for inspecting a track pitch of a magnetic disk in a magnetic disk drive having both a read head and the magnetic disk which includes a data region and on which a first burst pattern and a second burst pattern are recorded, said method comprising:

setting reference PES gain PG0 with respect to the read head;

moving the read head to a position K present between a center of the first burst pattern and a center of the second burst pattern;

generating, at the position K, by use of the PG0, a first position detection signal from a first burst signal obtained by reproducing the first burst pattern, and a second position detection signal from a second burst signal obtained by reproducing the second burst pattern;

calculating PESΔ that is a difference between the first position detection signal and the second position detection signal;

evaluating the PESΔ; and identifying, in response to the evaluation of the PESΔ, a data region related to the first burst pattern or to the second burst pattern.

2. The inspection method according to claim 1, wherein setting the PG0 includes calculating, for a plurality of burst patterns present on the magnetic disk drive, the plurality of PES gains satisfying a condition necessary to make the first position detection signal and the second position detection signal continuous in each of the plural burst patterns.

3. The inspection method according to claim 1, wherein: the magnetic disk drive includes a plurality of read heads; and setting the PG0 includes setting the PG0 for each of the plural read heads.

4. The inspection method according to claim 1, wherein moving the read head to the position K includes moving the read head to a position between positions K1 and K2 associated with a region which has the portions where, when the read head is moved to the position K, the first position detection signal and the second position detection signal change in a linearly inclining form, are parallel to each other.

5. The inspection method according to claim 1, wherein moving the read head to the position K includes setting a value of the first position detection signal or a value of the second position detection signal to a required value.

6. The inspection method according to claim 5, wherein the required value is an intermediate value between the value of the first position detection signal that is associated with a central position of the first burst pattern, and the value of the second position detection signal that is associated with a central position of the second burst pattern.

7. The inspection method according to claim 1, wherein moving the read head to the position K includes selecting a position at which a magnitude of the first burst signal and a magnitude of the second burst signal become equal to each other.

8. The inspection method according to claim 1, wherein identifying the data region includes, when the PESΔ oversteps a required data range, registering a data region related to the first burst pattern or the second burst pattern.

9. The inspection method according to claim 8, wherein the related data region is a data track.

10. The inspection method according to claim 8, wherein the related data region is a sector.

11. The inspection method according to claim 8, wherein the registration of the data region further includes registering defective sectors of the magnetic disk in a defect registration map.

12. The inspection method according to claim 1, wherein the first burst pattern and the second burst pattern are recorded such that phases of the burst patterns shift through 90 degrees with respect to each other in a radial direction of the magnetic disk.

13. The inspection method according to claim 1, wherein the burst patterns are written with a self-servowriting scheme by a write head of the magnetic disk drive.

14. The inspection method according to claim 1, wherein the magnetic disk drive employs a data-surface servowriting scheme.

15. A method for inspecting a track pitch of a magnetic disk in a magnetic disk drive having both a read head and the magnetic disk which includes a data region and on which a first burst pattern and a second burst pattern are recorded, said method comprising:

setting reference PES gain PG0 with respect to the read head;

moving the read head to a position K present between a center of the first burst pattern and a center of the second burst pattern;

generating, at the position K, by use of the PG0, a first position detection signal from a first burst signal obtained by reproducing the first burst pattern, and a second position detection signal from a second burst signal obtained by reproducing the second burst pattern;

calculating the PES gain PGn that satisfies a condition necessary to make the first position detection signal and the second position detection signal continuous;

calculating PGΔ that is a difference between the PG0 and the gain PGn;

evaluating the PGΔ; and identifying, in response to the evaluation of the PGΔ, a data region related to the first burst pattern or to the second burst pattern.

16. The inspection method according to claim 15, wherein calculating the PGn gain includes calculating the PGn gain such that at the position K, the first position detection signal or the second position detection signal takes an intermediate value S between the values of the first and second position detection signals, measured at the position K by use of the PG0.

17. The inspection method according to claim 15, wherein moving the read head to the position K includes setting a value of the first position detection signal or a value of the second position detection signal to a required value.

18. The inspection method according to claim 15, wherein moving the read head to the position K includes selecting a position at which a magnitude of the first burst signal and a magnitude of the second burst signal become equal to each other.

19. The inspection method according to claim 15, wherein identifying the data region includes, when the PESΔ oversteps a required data range, registering a data region related to the first burst pattern or the second burst pattern.

20. The inspection method according to claim 19, wherein the related data region is a data track.

* * * * *